March 1, 1960

C. G. MUNTERS ET AL 2,926,502

AIR CONDITIONING SYSTEM

Filed July 7, 1955

Inventors
Carl Georg Munters &
by Per Gunnar Norback

Eric Y Munson
Attorney

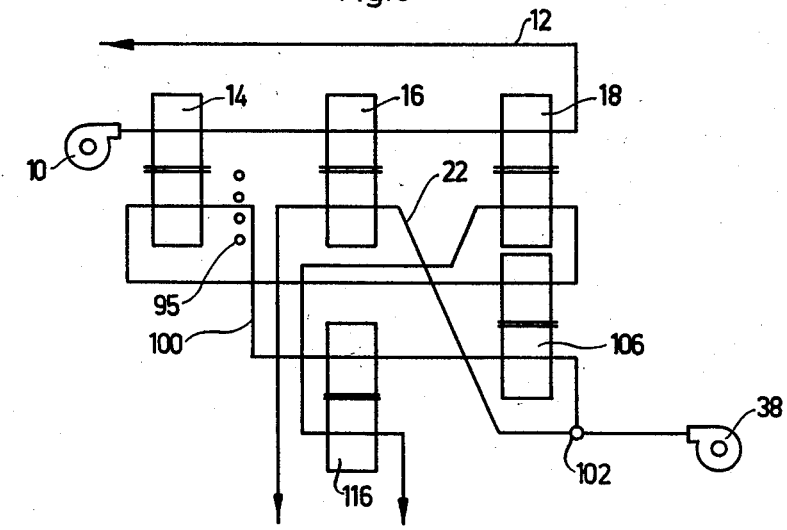
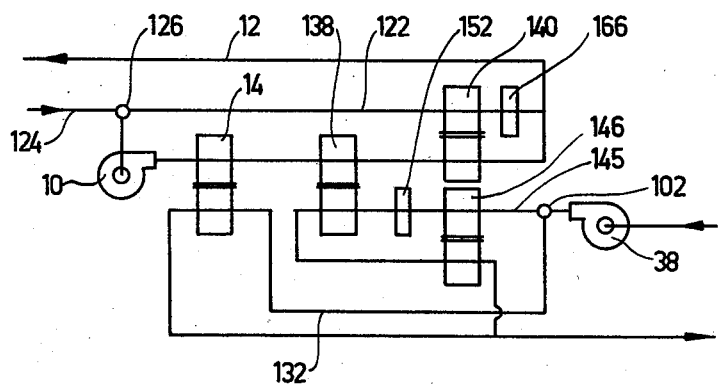

March 1, 1960  C. G. MUNTERS ET AL  2,926,502
AIR CONDITIONING SYSTEM
Filed July 7, 1955  8 Sheets-Sheet 4

Inventors
Carl Georg Munters &
Per Gunnar Norbäck
by
Eric Y Munson
Attorney

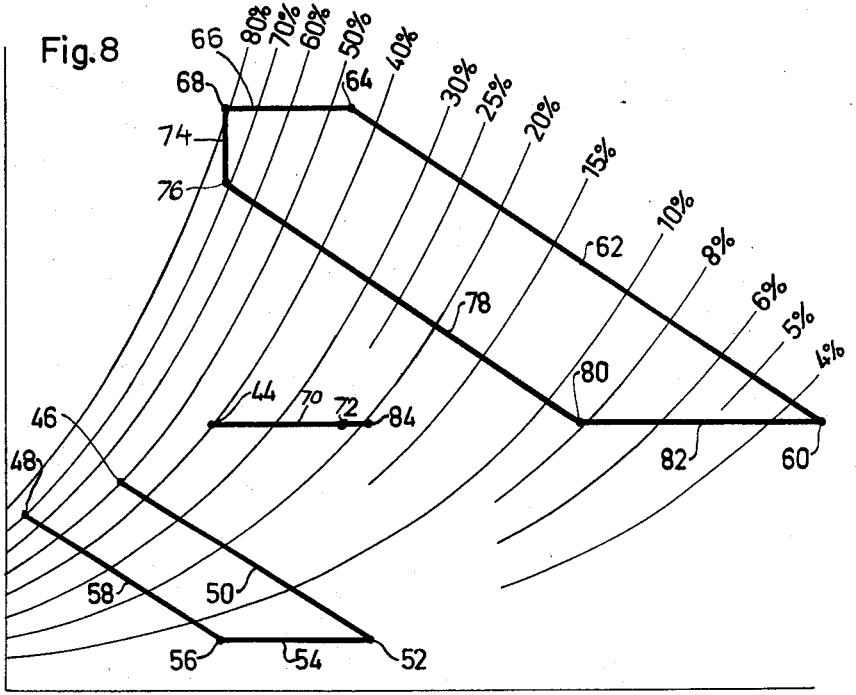
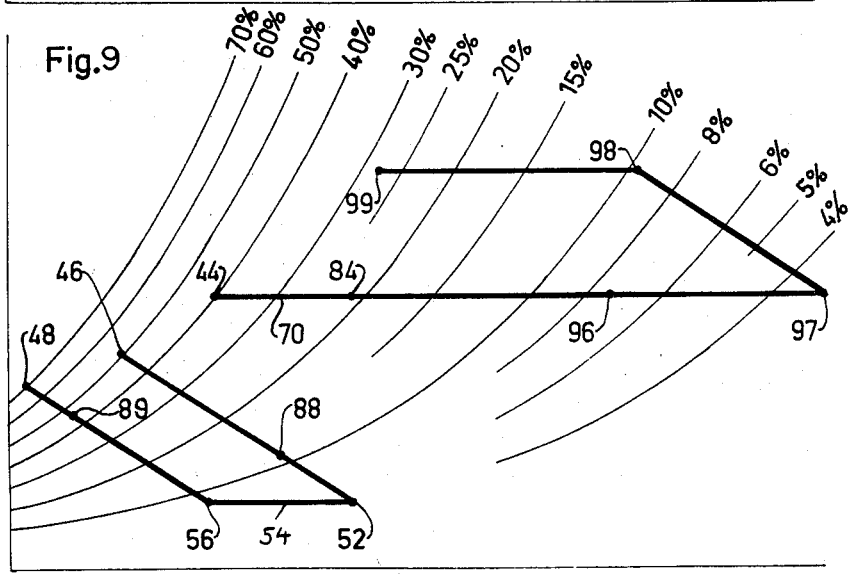

March 1, 1960

C. G. MUNTERS ET AL 2,926,502

AIR CONDITIONING SYSTEM

Filed July 7, 1955

Inventors
*Carl Georg Munters &
Per Gunnar Norbäck*
by *Eric Y. Munson*
Attorney 2,926,502

AIR CONDITIONING SYSTEM

Carl Georg Munters, Stocksund, and Per Gunnar Norbäck, Lidingo, Sweden, assignors to Lizenzia A.G., Zug, Switzerland, a corporation of Switzerland Application July 7, 1955, Serial No. 520,602

Claims priority, application Sweden July 12, 1954

16 Claims. (Cl. 62—94)

This invention relates to an air conditioning system for an enclosure according to which dehumidification and cooling of the room air is accomplished by thermo-dynamic exchanges with other air and more particularly to such a system wherein dehumidification of the air is a prerequisite for satisfactory conditioning of the enclosure. The term thermodynamic exchanges as used in the specification and claims is intended to include an exchange of sensible heat or an exchange of moisture with a resultant liberation or absorption of latent heat, or both.

The higher the air temperature, the more important will be the role played by the moisture emission from the human body in respect of its heat regulation and thus of its feeling of comfort. For this reason air conditioning will not only satisfy a demand for a lowered temperature, but a lowering of the humidity is also a factor of vital importance.

One principal object of the invention is to provide an air conditioning system taking this fact into account which is extraordinarily economical in operation.

Another object of the invention is to provide an air conditioning system which combines simplicity of construction and low production cost with a high co-efficient of performance.

Further objects and advantages of the invention will be apparent from the following description considered in connection with the accompanying drawings which form part of this specification and of which:

Figs. 1 to 7 illustrate diagrammatically eight embodiments of the invention.

Figs. 8 to 14 illustrate psychrometric charts corresponding to the various embodiments.

In different figures equivalent parts have been given like reference numerals.

Figure 1:
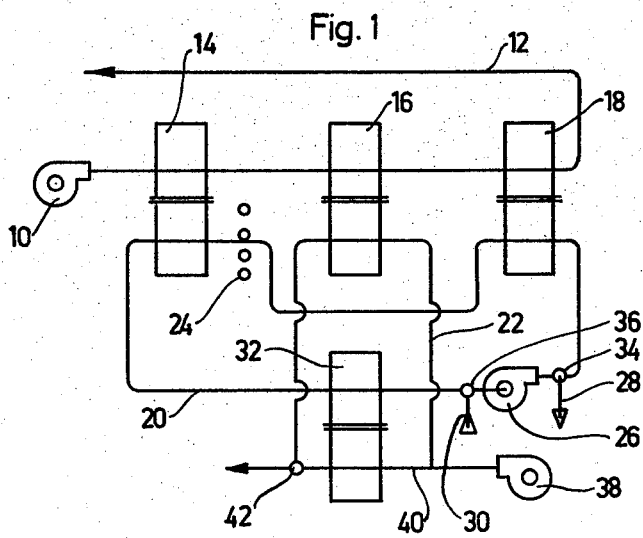
Figure 2:
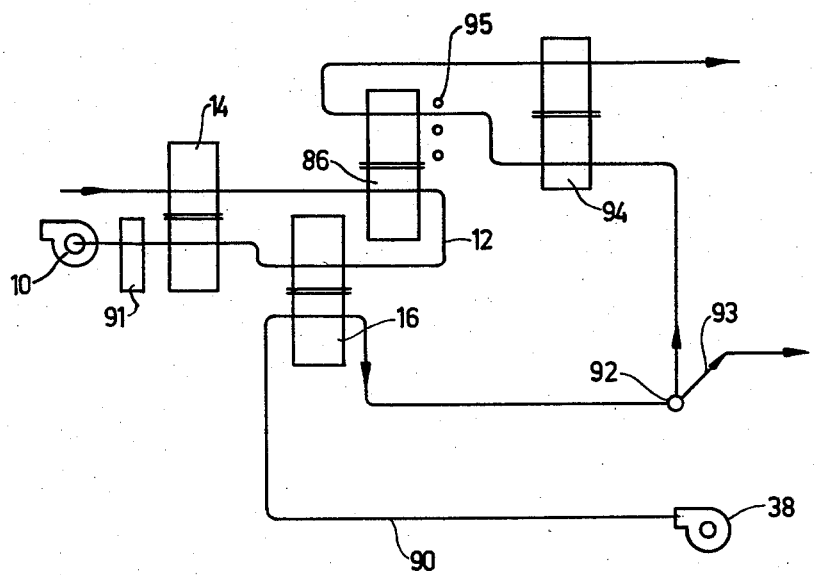

The several systems illustrated in the drawings are intended to condition the air in an enclosure subjected to hot climatic conditions, i.e., a temperature is to be maintained in the enclosure which is lower than that of the outdoor air, and at the same time moisture is to be removed from the enclosure in order to render the atmosphere therein comfortable. For this purpose, air from the enclosure is caused by a blower 10 to pass through a passage 12 which according to Figs. 1 to 7 commences and terminates in the enclosure. In this passage, according to Fig. 1, are connected a moisture exchanger 14, a heat exchanger 16 and a further moisture exchanger 18 which are passed in tandem by the air coming from the enclosure. Within the moisture exchangers moisture is transferred to an outdoor air flow passed through a passage 20, and within said heat exchanger heat is transferred to another outdoor air flow which is passed through a passage 22.

Thus it will be seen that a moisture exchanger according to the invention has the purpose of transferring moisture from one air flow to another. Said moisture exchanger is preferably of the kind which at the same time will transfer a minimum amount of heat between the fluids. As an example, moisture exchangers of the construction disclosed in the co-pending patent application Serial No. 502,852 filed April 21, 1955 will satisfy extraordinarily high demands in this respect. The exchanger could, however, also be of other types, such as for example the type disclosed in the co-pending patent applications Serial Nos. 442,686 and 442,687, both filed July 12, 1954. A common feature of the moisture exchangers preferred for use in the present invention resides in their being of the regenerative type having a transferrer body moving in a closed circuit along which its individual portions are passed continuously through the two flow passages in which the moisture exchanger is inserted. The moisture transferrer preferably is in the form of thin wires or, still better, layers of foils or sheets. Preferably, the moisture exchangers are of the continuously operating type, though intermittently operating moisture exchangers may also be used in which the exchanger body may consist of two absorptive elements of which one is adapted to absorb moisture only while the other is subject to regeneration.

The heat exchanger 16, on the other hand, is primarily intended to be of the kind which substantially transfers sensible heat only, and thus substantially no or only a reduced amount of moisture, between the air flows in the two passages. The heat exchanger, to advantage, could be for example of the type disclosed in the co-pending patent applications Serial Nos. 387,656 filed October 22, 1953, now abandoned, and 442,686 filed July 12, 1954, and may be of the regenerative type having a transfer body moving in a closed circuit through the two passages through which the air flows. Said transfer body may be composed of thin wires or foils or sheets, respectively. Whenever in the following description reference is made to moisture or heat exchangers, respectively, such exchangers of the type just described will generally be understood thereby.

Inserted into the passage 20 is a radiator 24 situated in the portion thereof intermediate the two moisture exchangers 14 and 18. The air is caused by a blower 26 to circulate in the passage 20. Located between the moisture exchanger 18 and the blower 26 is an outlet 28 through which a portion of the air in circulation within the passage 20 is continuously vented to the atmosphere to be replaced by fresh outdoor air entering the passage through an intake 30 disposed between a heat exchanger 32 and the blower 26. Valve devices 34 and 36 known per se are provided for adjusting the rate of fresh-air admission into the passage 20.

The heat exchanger 32 is passed, on one hand, by the air in circulation in the flow passage 20, and on the other by an auxiliary air flow which is caused by a blower 38 to flow through a duct 40 and to be vented to atmosphere downstream of the heat exchanger. The flow passage 22 is shunted from the duct 40, by-passing heat exchanger 32 and a valve device 42 may be disposed for adjusting the rate of flow of air from the blower 38 passing through the heat exchanger 16, and the rate of flow of air passing through the heat exchanger 32.

The operation of the apparatus will now be explained in conjunction with the psychrometric chart presented in Fig. 8. The outdoor air is considered to be in the condition 44 indicated in the diagram and corresponding to a temperature 35° C. and a relative humidity of 40%. Air of this condition is thus introduced through the intake 30 and blower 38.

In Figs. 8 to 14 the ordinates represent in suitable terms, such as grams of $H_2O$ per kilogram of dry air, the absolute air humidity, the abscissae represent temperature in ° C. The diagrams further contain curves pertaining to several percentages of relative humidity of the air.

Figures 7, 8:
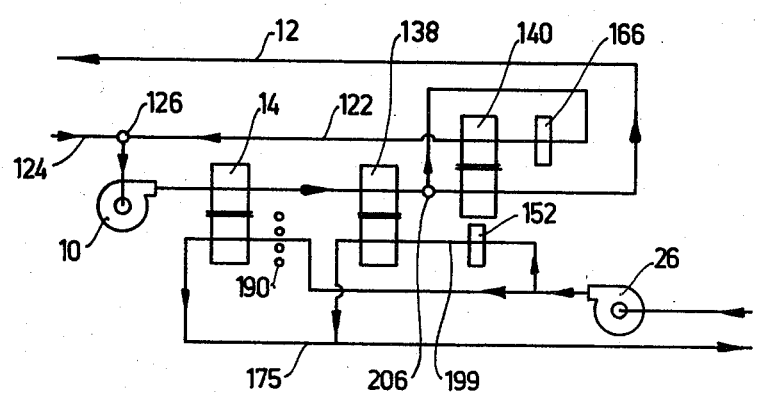

Room air caused by the blower 10 of Fig. 1 to pass through the flow passage 12 is presumed to have an initial condition as indicated by the point 46 in Fig. 8 representing a temperature of 27° C. and a relative humidity of 50%. A final condition of the room air flowing through the passage represented by the point 48 is to be attained, corresponding to a temperature of 18° and a humidity of 70%. These values are representative of living-rooms, assembly rooms and the like enclosures to produce the desired ambient air conditions, it being understood, however, that they do not in any way limit the scope of the invention but may be varied optionally. Thus, the values will be different if excessive moisture is developed within the enclosure from the operation of mechanical equipment or from other sources.

In the following description, where reference is made to various points in the diagrams there will be suffixed to the numeral denomination a bracketed record of the condition prevailing at that point in respect of temperature in °C. and relative humidity in percents. The temperature values have been converted from diagrams representing the temperature °F., the values in °C. being in most cases rounded off to the nearest half-degree.

Referring to Fig. 1, and the corresponding psychrometric charts shown in Fig. 8 room air in condition 46 according to the chart, in the moisture exchanger 14 will give off moisture to the air in the passage 20, with a consequent change in the psychrometric condition thereof, along the enthalpy line 50 until it acquires the condition represented by point 52 (48°, about 4%). Thus, by sorption of moisture in the moisture changer 14 the temperature has simultaneously been raised. In the heat exchanger 16 a heat exchange against outdoor air will take place in the passage 22 and will follow moisture content line 54 extending parallel to the abscissa. After having passed through the heat exchanger, the room air will have the condition represented by point 56 (36°, about 7%). In the present embodiment the room air is finally passed through the moisture exchanger 18 wherein moisture is picked up from the air in passage 20 by evaporation and acquires the condition represented by the enthalpy line 58 to the point 48 (18°, 70%). The room air in its final condition 48 has a lower absolute humidity, and in the present case also a lower temperature, than in its initial condition 46.

The foregoing results are obtained by the thermo-dynamic exchanges with the air in passages 20 and 22. As the room air enters the moisture exchanger 14 from one side the outdoor air or other air in passage 20 enters the opposite side thereof.

This other air in the passage 20 has then acquired the psychrometric condition represented by the point 60 of the diagram (89°, about 3.5%) in a manner to be explained more fully in the following.

Moisture is removed from the room air and transferred to the dryer and warmer air in passage 20 in the moisture exchanger 14. The moisture removal is represented by the enthalpy line 50 whereas the moisture pick-up by the air in passage 20 is represented by the enthalpy line 62. Thus the psychrometric conditions of the room air upon exit from exchanger 14 is represented by the point 52 (48°, 4%), whereas the condition of the air in passage 20 upon exit from the opposite side of the moisture exchanger 14 is represented by the point 64 (47°, 47%). It will be noted that the temperature of the air in passage 20 at point 64 is higher than the temperature of the auxiliary air entering the heat exchanger 32 through duct 40 as evidenced by the temperature positions of the points 64 and 44 respectively. Thus the air in passage 20 will be anhydrously cooled in the heat exchanger 32 and the heat picked up therein by the air supplied from blower 38 and duct 40 will be dissipated into the atmosphere through the valve 42.

The change in the psychrometric condition of the auxiliary air in the exchanger 32 is represented by the line 70 extending from the point 44 (35°, 40%) to point 72 (46°, 23%), whereas the change of the air in passage 20 passing through the heat exchanger 32 is represented by the line 66 extending from point 64 (47°, 47%) to point 68 (36°, 82%).

In order to maintain the balance of the system, as much moisture should be removed from the passage 20 as is represented by the difference in moisture content between the air entering passage 12 and leaving said passage. Therefore atmospheric air is drawn into passage 20 through the valve 36 and an equal amount exhausted through valve 34. The mixture of the high moisture containing air leaving exchanger 32 with the atmospheric air bring about a change of the psychrometric condition of the air in passage 20 represented by the line 74 extending between the points 68 to 76, on Fig. 8 (36°, 72%).

In the meantime the room air, having passed through the moisture exchanger 14 where it acquired the approximate psychrometric condition represented by the point 52 (48°, 4%) passes through the heat exchanger 16 in heat exchange relationship with the outdoor air impelled through the by-pass 22 by the blower 38. This air has the psychrometric condition represented by the point 44 on Fig. 8 (35°, 40%); as this air passes through the heat exchanger 16, without picking up substantial moisture, it is anhydrously cooled by the outdoor air of by-pass 22 passing through the heat exchanger from the opposite side thereof. The room air exiting from the heat exchanger 16 has now acquired the approximate psychrometric condition represented by the point 56 (36°, 7%), whereas the out-door air exiting from the opposite side of the heat exchanger 16 has acquired the approximate psychrometric condition represented by the point 84 (47°, 21%). This outdoor air is then dissipated into the atmosphere through the valve 42 together with that having passed through the heat exchanger 32.

The room air coming from the heat exchanger 16 represented by the point 56 (36°, 7%) now enters the moisture exchanger 18 where it encounters the outdoor air from passage 20 having the approximate psychrometric condition represented by the point 76 (36°, 72%) from which the room air picks up moisture and is thus adiabatically cooled to acquire the final psychrometric condition for which the system has been designed and what is represented by the point 48 (18°, 70%).

On the other hand the outdoor air of passage 20 passing through the moisture exchanger 18 gives off moisture and is thus adiabatically heated so as to acquire the approximate psychrometric condition represented by the point 80 in Fig. 8 (67°, 8%). This outdoor air is then to be used to dry the room air passing through the moisture exchanger 14, but in order to have sufficiently relative humidity to regenerate the moisture exchanger and give the room air the psychrometric condition represented by point 52 (48°, 4%) this regenerative current of air must be further heated to acquire the approximate psychrometric condition represented by the point 60 in Fig. 8 (89°, 3.5%). This sensible heating is represented by the line 82. The air is then passed through the moisture exchanger and the cycle is repeated.

As will easily be understood from the above explanation the system illustrated in Fig. 1 will only operate under heat supply, and thus without any extraneous water supply to any of the air flows. If the amount of air in the room air circuit 12 is 100% the amount of outdoor air passed through the regeneration passage 20 will be less to an extent corresponding to the ratio of lengths of the lines 50 and 62, thus in the illustrated case approximately 50%. In order to lower the absolute humidity from point 68 to point 76, a dilution with about 25% of the amount of air in the regeneration passage will be necessary. With the positions of the intake 30 and outlet 28 on either sides of the blower 26 as illustrated in the example in consideration, said blower must be dimensioned for an effect amounting to about 60% of the total air quantity. The heat exchanger 16 requires an amount of outdoor air of 100%, and the heat exchanger 32 an amount of outdoor air of 50%, thus in total 150%. The ratio (C.P.) of the quantity of heat consumed in the system to heat content removed from the room air, according to the psychrometric chart, will be approximately 0.9.

The chart presented in Fig. 8 takes into account a certain operating efficiency of the respective exchangers which, as stated in the patent applications above referred to, can be very high, such as at least 90%. On the other hand, the chart presupposes an exchange exclusively of moisture, or of heat, to be effected. If simultaneously with the intended change of condition a certain change of condition of the other kind is caused, then the points in the chart will be correspondingly displaced so as by associating the moisture delivery according to line 50, for example, with a heat transfer between the air flows to cause the point 52 to be displaced to the right following the prolongation of line 54. In practice a change of condition of the kind following an enthalpy line exactly cannot be obtained, partly due to the fact that the sorption heat cannot be separated from the amount of condensation heat of the vapor, and partly due to inevitable heat capacity of the transfer body.

In the embodiment just described the entire amount of moisture required for the humidification of the room air according to line 58 is gained from the outdoor air passage 20. In the embodiment shown in Fig. 2 and its associated psychrometric chart, Fig. 9, said humidification is effected in part within the first moisture exchanger 14 by means of the room air which will thus exchange moisture with itself during two steps of the process. However, since simultaneously therewith moisture will have to be removed from the room air flowing through the passage 12, moisture removal is provided for within a second moisture exchanger 86. The change in condition of the room air according to the chart will follow, in principle, the same pattern as before but with the exception that the enthalpy line 50 will be divided into two sections, viz. a first section between points 46 and 88 (40°, 12%) corresponding to the moisture transfer to the room air itself from the condition 56 to the condition 89 (22.5°, 45%). The second dehumidification section, i.e. between points 88 and 52, is effected within the moisture exchanger 86 as will be described more in detail hereinbelow. Thereafter the room air will pass through the exchanger 16 where said air is cooled by outdoor air impelled by the blower 38 into a passage 90. The change in condition of the room air is represented by the line 54 connecting points 52 and 56, and that of the outdoor air by the line 70 connecting points 44 and 72.

The room air then continues to the moisture exchanger 14 and will acquire the condition 89 in order finally to pass through an evaporator pad 91 of a known type in which extraneous water evaporates into the room air. The change of condition of the inside air within the evaporator pad 91 substantially follows an enthalpy line from point 89 to point 48 representing the final condition to be attained by the room air. The evaporator pad is preferably but not necessarily of the kind disclosed in patent application Serial No. 442,688, filed July 12, 1954, now Patent No. 2,809,817. The device 91 may also be of the conventional type in which atomized water is brought into direct contact with the air flow.

Disposed in the passage 90 and downstream of the heat exchanger 16 is a valve 92 through which a pre-determined amount of the air in passage 90 is vented to the atmosphere through the outlet 93. This portion may be about half the amount of the outdoor air impelled by the blower 38. The balance of the outdoor air will pass successively through a heat exchanger 94, a heater 95, a moisture exchanger 86 and finally again through the heat exchanger 94 to the atmosphere. This process is represented in the chart by heat absorption from point 84 to point 96 (70°, 7%) effected within the heat exchanger 94. The heater 95 acts further to increase the temperature of the outdoor air to point 97, (89°, 3.5%). The outdoor air will now possess a relative humidity lower than that of the room air in condition 52 and will thus be capable of regeneration within the moisture exchanger 86 during which phase the change of condition will follow an enthalpy line to point 98 (72°, 10%). Said change of condition thus corresponds to the change of condition of the room air between points 88 and 52. The heat content in excess possessed by the outdoor air at point 98 will finally be transferred within the heat exchanger 94 to the outdoor air in the condition 84, the outdoor air hereunder reaching its final condition 99 (40°, 28%). In this case, the C.P. will be as low as about 0.5.

Figure 10:
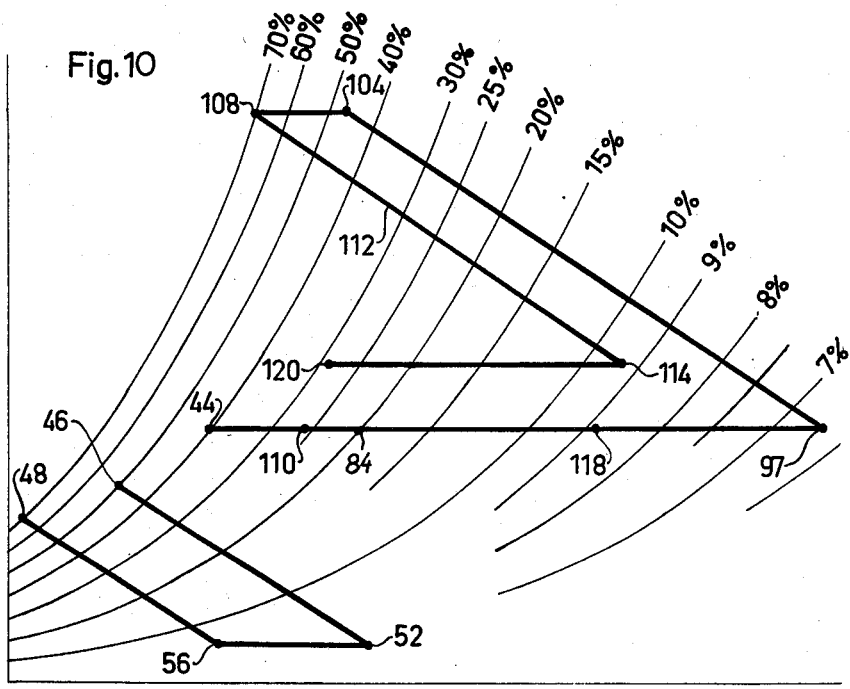

The embodiment shown in Fig. 3 and its associated psychrometric chart, Fig. 10, corresponds to that of Fig. 1 inasfar as the room air is circulated in the sequence stated, through the moisture exchanger 14, the heat exchanger 16 and the moisture exchanger 18 located in the passage 12, before being returned into the enclosure. Furthermore, the heat exchanger 16 is fed directly with outdoor air through the passage 22 by means of the blower 38. A regenerating air flow is forced through a passage 100 into which outdoor air is supplied through a valve 102 by the blower 38 common to both passages.

Upon passage through the heater 95 the outdoor air will have reached the condition represented by point 97 (89°, about 3.5%) of the Fig. 10. In the moisture exchanger 14 a moisture transfer will be effected causing dehumidification of the room air from point 46 to point 52, and moisture absorption by the outdoor air from point 97 to point 104 (47°, 47%). Since at the point 104 the regenerating air leaving moisture exchanger 14 is warmer than the entering atmospheric air, said regenerating air is passed in heat exchange with entering outdoor air in heat exchanger 106 to preheat the atmospheric air just entering the passage 22. As a consequence the temperature of the first-mentioned outdoor air falls from point 104 to point 108 (38.5°, 72%) and that of the fresh atmospheric air increases from point 44 to point 110 (43.5°, 26%). When entering the moisture exchanger 18 the air in the regeneration duct is in the condition 108 delivering moisture following the enthalpy line 112 to point 114 (71.5°, 8.5%), which moisture is absorbed within the moisture exchanger by the room air which thus is humidified from point 56 to the final condition 48. Downstream of the moisture exchanger 14 the outdoor air in the passage 100 will have a temperature considerably higher than that of the impelled outdoor air after having been blown through the heat exchanger 106 and having reached the condition 110. Therefore, the outdoor air present in the outdoor air flow streaming towards the heater 95 is caused to absorb heat within a heat exchanger 116 from the outdoor air discharged from the moisture exchanger 18. This measure is represented in the psychrometric chart by the change of condition with the first branch from point 110 to point 118 (69°, 8%) and for the second branch from point 114 to point 120 (46°, 28%). The heater 95 causes the rise in temperature between the points 118 and 97.

If the amount of air in the room air passage 12 is assumed to be 100% the amount in the passage 100 will be about 50% and in the passage 22 about 100%. Consequently, the blower 38 should supply a total quantity of air by 50% surpassing the quantity supplied by the room air blower 10. In this case the C.P. will be approximately 0.9.

Figure 11:
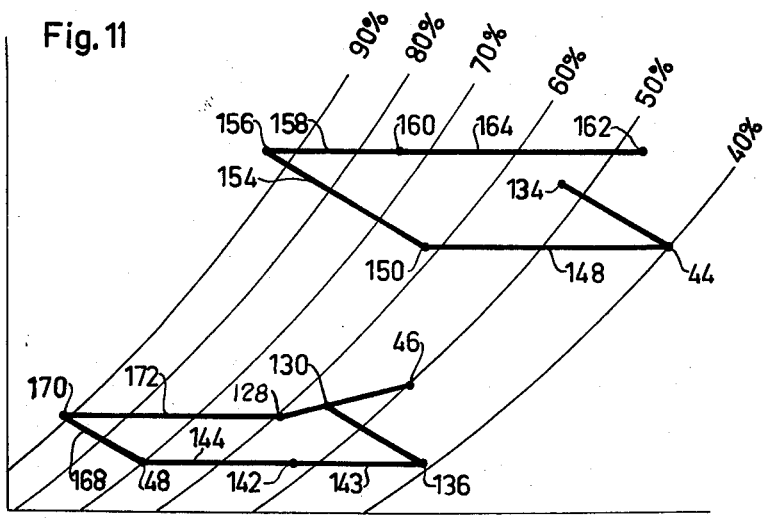

The embodiment shown in Fig. 4 and associated psychrometric chart, Fig. 11, differs from those described hereinbefore by the feature, inter alia, that the system is operated entirely without any heat supply. The room air passage 12 commencing and terminating in the enclosure or room has a shuntduct 122 through which a predetermined quantity of air is reintroduced into the system instead of being discharged into the enclosure or room, and which thus together with a portion of the room air passage forms a closed passageway. This air quantity is greater than the air quantity returned into the enclosure and is assumed in the example in consideration to be approximately twice said returned air quantity. The room air introduced into the system through conduit 124 is mixed in a valve 126 with auxiliary air from the duct 122 whereupon the air mixture is forced through the moisture exchanger 14. In the associated psychrometric chart said mixing step is represented by room air in the condition indicated by the point 46 and auxiliary air in the condition indicated by point 128 (22.5°, 60%) together attaining the condition indicated by point 130 (24°, 56%). Within the moisture changer 14 the air mixture may be dehumidified directly by outdoor air impelled by the blower 38 and returned into atmosphere through a passage 132. This air, as in the preceding embodiments, has the initial condition represented by the point 44 and will change said condition following an enthalpy line to point 134 (31.5°, 54%), said air mixture then being dehumidified to the condition represented by point 136 (27°, 41%).

Said air mixture is cooled in two steps in the heat exchangers 138 and 140, and its changes of condition will follow the line 143 to point 142 (23°, 52%) and the line 144 to point 48, respectively, which latter is, as in the preceding embodiment, the final condition desired to be attained by the room air.

The heat exchanger 138 is passed by outdoor air introduced by the blower 38 and fed through a passage 145 via a distributor 102. Prior to its entry into the heat exchanger 138 the outdoor air has been cooled in a heat exchanger 146 from the condition represented by the point 44 following line 148 to the condition represented by point 150 (27°, 62%), and has thereafter been subjected to a further change of condition by evaporation of water in an evaporation pad 152, following the enthalpy line 154 to point 156 (22°, 95%). The heat absorption of this outdoor air flow corresponds to the line 158 leading to point 160 (26°, 75%) and corresponding to the line 143 interconnecting the points 136 and 142. In the heat exchanger 146 the outdoor air flow will exchange heat with itself so that its escaping branch will reach the final condition 162 (34°, 48), the line 164 interconnecting the points 160 and 162 then corresponding to the line 148. The outdoor air flow will be discharged into the atmosphere in a psychrometric condition represented by the point 162 of the psychrometric chart shown in Fig. 11.

The temperature difference required for cooling the air mixture is produced by means of an evaporation pad 166 located within the duct 122 and shaped, as also is the evaporation pad 152, so as to resemble the evaporation pad 91. When leaving the heat exchanger 140, as previously stated, the air mixture will be in the final condition 48. In the evaporation pad 166 an evaporation of water will take place and cool the auxiliary air when in return flow through the duct following the enthalpy line 168 to point 170 (15.5°, 94%) thus imparting to said auxiliary air a psychrometric condition under which it is capable of absorbing heat following the line 172 to attain the previously mentioned condition represented by the point 128. The line 144 interconnecting points 142 and 48 and the line 172 represent the changes of condition of the two air currents streaming through the heat exchanger 140. The line 172 is longer than the line 144 which is due to the fact thtat the auxiliary air quantity in the duct 122 only amounts to two thirds of quantity of the air mixture traversing said heat exchanger. The regenerated air quantity returned into the enclosure is, of course, equal to that supplied to the system from the enclosure through the conduit 124. As will be understood from the psychrometric chart in consideration the flows of outdoor air impelled through the humidity exchanger 14 and the heat exchanger 138, respectively, are equal to the flow of air mixture fed through the same exchangers. The C.P. equals zero, since no heat supply is necessary.

Figure 5:
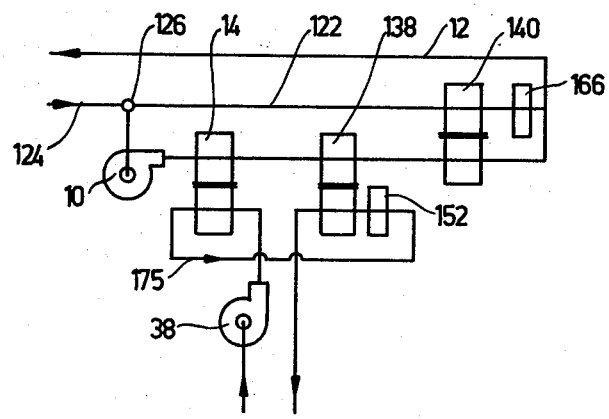
Figure 12:
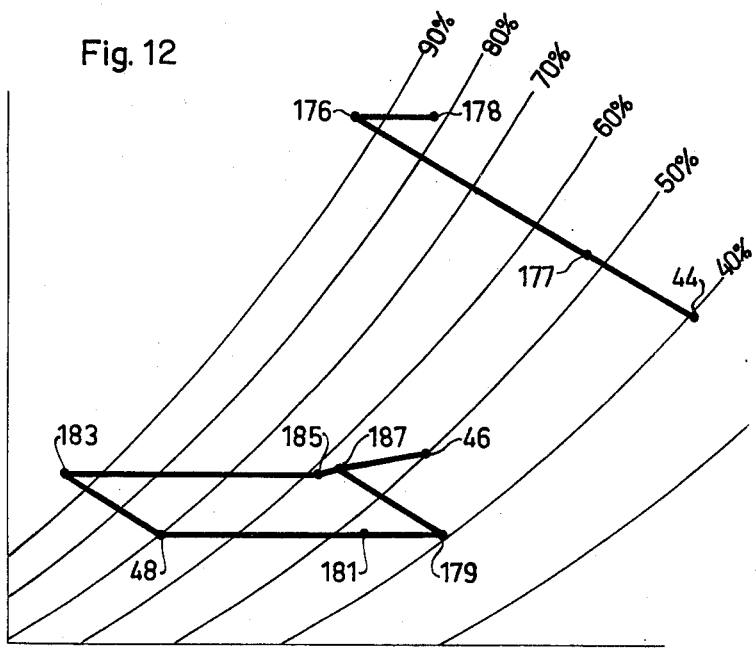
Figure 13:
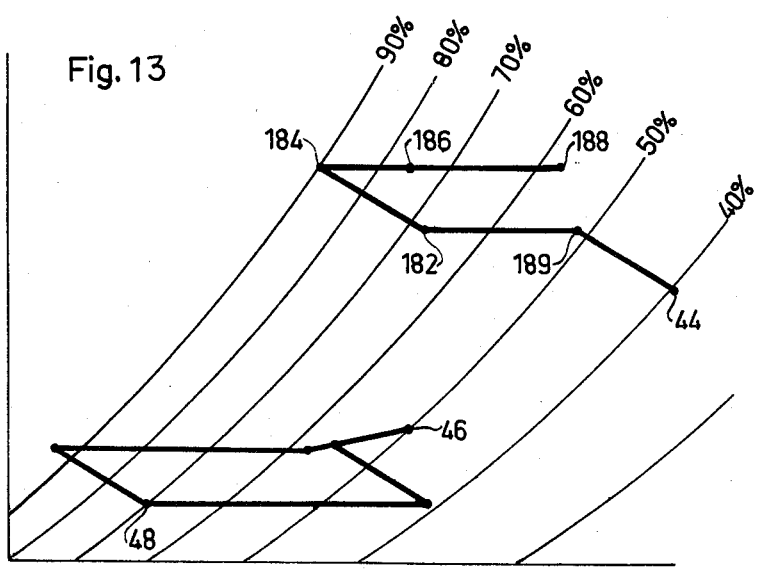

The embodiment shown in Fig. 5 and its associated psychrometric chart Fig. 12, like the preceding one, includes an auxiliary air passage disposed on the room air side and circulating along a closed passageway simultaneously with the circulation of room air from and into the enclosure or room. However, in this case the quantity of auxiliary air quantity is larger, surpassing in the embodiment in consideration by four times the quantity of room air, as compared with twice said quantity in the preceding example. The object of said measure is to displace the point 142 sufficiently to the right in the chart to make the heat exchanger 146 superfluous. A greater share in the cooling of the air mixture will thus be allotted to the heat exchanger 140 when compared with the preceding embodiment. This feature will involve the possibility of producing cooling of the heat exchanger 138 by simpler means.

The outdoor air in the psychrometric condition 44 is introduced into passage 175 and will first traverse the moisture exchanger 14 in which it will assume the psychrometric condition represented in the chart by point 177 (32°, 53%). In the embodiment shown in Fig. 5, however, the same air is caused to traverse the evaporation pad 152 causing a change of the psyhcrometric condition of the outdoor air to follow an enthalpy line extending to the point 176 (24°, 96%). This will enable the realization of a heat exchange in the heat exchanger 140 from point 176 to point 178 (26.5°, 83%) on the outdoor air side, and from point 179 (27°, 41%) to point 181 (24.5°, 48%) on the air mixture side. The fresh air blower 38 in this case has a capacity corresponding to five times the quantity of room air circulating between the enclosure or room and the conditioning system.

On the room air side the auxiliary air downstream of the evaporation pad 166 attains the condition represented by point 183 (15.5°, 97%), and downstream of the heat exchanger 140 the condition represented by point 185 (23.5°, 59%). The psychrometric condition of the air mixture upstream of the blower is represented by point 187 (24°, 57%).

The outdoor air leaving the system in the embodiment shown in Fig. 5 is in the psychrometric condition 178 and thus has a temperature substantially lower than that of the fresh outdoor air the psychrometric condition of which is represented by the point 44. In order to utilize said temperature difference, the embodiment shown in Fig. 6 and its associated psychrometric chart Fig. 13 includes a heat exchanger 180 traversed on the one hand by the branch of the outdoor air current 175 coming from the moisture exchanger 14 and on the other hand by said outdoor air current coming from the heat exchanger 138. The transfer operating in the room air passage with its auxiliary air passage will be the same as in the preceding embodiment but for feature that the proportional ratio of room air and auxiliary air in circulation is 1:3, involving slight changes in the psychrometric conditions at the several stations. As was the case in the embodiments shown in the Figs. 4 and 5, the air mixture is dried in the moisture exchanger 14 to the absolute humidity level represented by the point 48, the relative humidity after the drying operation, however, not decreasing below that of the fresh outdoor air.

The outdoor air is cooled in the heat exchanger 180 after the point 189 (32°, 51%), i.e. upon its exit from tion represented by point 182 (27°, 67%). After hu-
the moisture exchanger 14, to the psychrometric condi-
midification in the evaporation pad 152 following an
enthalpy line extending from point 182 to point 184
(24°, 90%) said air will absorb heat within the heat
exchanger 138 and attain the condition represented by
point 186 (26.5°, 76%). From said point 186 a further
heat absorption in the heat exchanger 180 brings the
outdoor air into its final psyhcrometric condition repre-
sented by point 188 (31.5°, 58%). In the heat ex-
changer 180 one branch of the outdoor air current thus
has delivered heat between the points 189 and 182, which
heat has been absorbed by the other branch of said cur-
rent between the points 186 and 188. The point 188 in-
dicates a higher temperature level than did the point 172
in the preceding embodiment.

Figure 6:
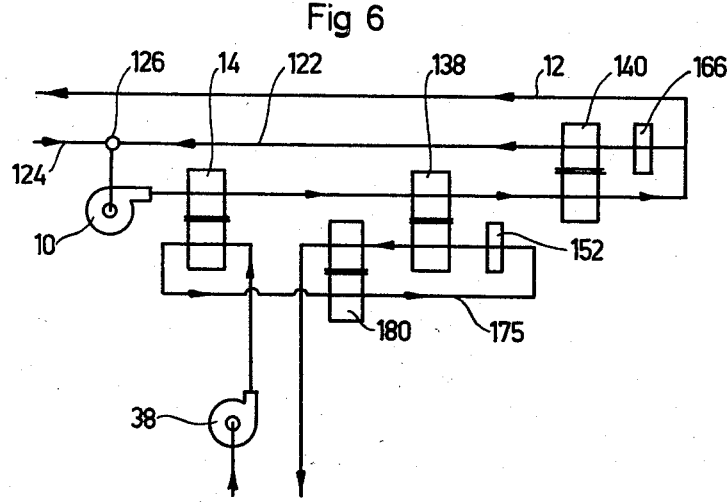
Figure 14:
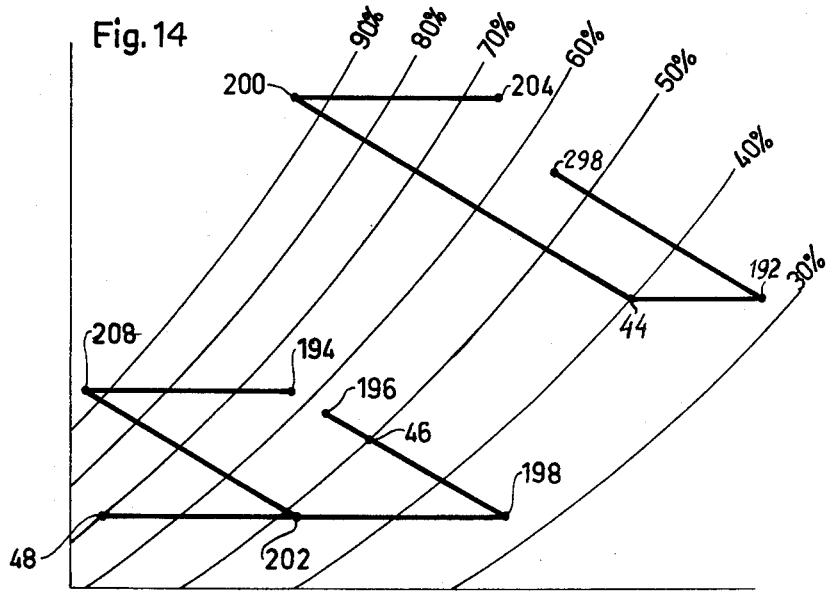

The embodiment shown in Fig. 7 and its associated
psychrometric chart Fig. 14 differs from those illustrated
in the Figs. 4 to 6 by the feature that the regeneration
air is slightly heated in order to reduce the quantities of
air traversing the system. The outdoor air passage 175
includes a heater 190 on the upstream side of the
moisture exchanger 14. As will be seen from Fig. 14
the outdoor air in the psychrometric condition repre-
sented by the point 44 is caused to assume the condi-
tion represented by point 192 (39°, 32%). The room
air which as in the preceding embodiments is assumed
to be in the condition represented by the point 46 prior
to its entry into the moisture exchanger 14 is mixed
with auxiliary air discharged from the duct 122 and thus
brought into the condition represented by point 194
(24.5°, 64%) and the air mixture will attain the condi-
tion represented by point 196 (25.7°, 57%). In this
embodiment the share of auxiliary air in the air mixture
will be minor than in the preceding embodiments the
ratio assumed being 1:1. Within the moisture exchanger
the moisture content of the air mixture is reduced to
point 198 (31°, 33%) and at the same time that of the
outdoor air in the condition represented by the point 192
will be increased so as to attain the condition represented
by point 298 (32.5°, 55%).

In the passage 199 another outdoor air flow is changed
by the evaporation pad 152 from the condition repre-
sented by the point 44 to the condition represented by
point 200 (24.5°, 95%). Said branch-flow will then
traverse the heat exchanger 138 and cool the air mix-
ture traversing said exchanger on the room air side to
assume the condition represented by the point 202
(25°, 47%) said outdoor air escaping in the condition
represented by point 204 (30.5°, 65%). In a distribut-
ing valve 206 the air mixture is divided into two flows
one of which enters the duct 122 in which it will first
traverse the evaporation pad 166 causing cooling of said
air to assume the psychrometric condition represented by
point 208 (17.5°, 95%). In the heat exchanger 140 the
auxiliary air in the duct 122 will absorb heat so as to
attain the condition represented by the point 194, and
said heat will transform the room air re-circulated into
the enclosure or room from the condition represented by
the point 202 to the final condition represented by the
point 48. As already stated above, the quantity of air
turned into the enclosure or room equals the quantity
of air returned to the blower 10 through the duct 122.
The C.P. will be approximately 0.5 to 0.6.

It is also possible to combine elements of the various
embodiments shown and described in any suitable man-
ner in order to satisfy particular demands or to meet
specific conditions.

While several more or less specific embodiments of the
invention have been shown and described, it is to be
understood that this is for purpose of illustration only,
and that the invention is not to be limited thereby, but
its scope is to be determined by the appended claims.

It should be understood, particularly, that the desig-
nation "air permeable solid sorbent material" in the
claims appended hereto includes a cellular structure of
solid material carrying a sorbent composition as men-
tioned in copending application Serial No. 502,852, which
is referred to herein. It may of course also include
any air permeable solid material impregnated with a
hygroscopic material so as to render it capable of ab-
sorbing or adsorbing moisture.

What we claim is:
1. The method of conditioning air for an enclosure
by exchange means moving cyclically between passage
means for the air leaving the enclosure and passage
means for the air coming into the enclosure, which
method comprises impelling the leaving air through said
exchange means, drying said air by sorption, passing the
thus dried air through a sensible cooler to reduce its
temperature, passing the thus cooled air back through
said exchange means to be further cooled by exchange
with the leaving air.

2. The method of conditioning air for an enclosure
which comprises passing the air to be conditioned through
a first drying zone containing a sorbent material, stor-
ing moisture removed from the air in said first drying
zone in said sorbent material, passing said air through
a second drying zone, passing the thus dried air through
a cooling zone, and then passing said cooled air through
a remoistening zone, moving the sorbent material cycli-
cally between said first drying zone and said remois-
tening zone, whereby the stored moisture is evaporated
into said air and then passing the thus conditioned air
into the enclosure.

3. The method of conditioning air from a enclosure
which comprises the steps of passing the air to be con-
ditioned through a drying zone containing a sorbent
material, continuously circulating and re-using a sepa-
rate heated medium in a closed circuit through a regen-
erating zone, cyclically moving the sorbent material be-
tween said zones, and introducing secondary air into
said closed circuit, said secondary air having a lower
water vapor pressure than said heated medium upon
entry into said closed circuit.

4. The method of conditioning air for an enclosure
which comprises the steps of passing the air to be con-
ditioned through a drying zone containing a sorbent
material, continuously circulating and re-using a heated
medium in a regenerating zone in a closed circuit, cycli-
cally moving the sorbent material between said zones,
bleeding off a small percentage of said heated medium
and substituting therefor an equal quantity of secondary
air having a lower water vapor pressure than said heated
medium.

5. Method according to claim 3 according to which
the heated medium has a substantially smaller volume
than the air to be conditioned.

6. The method of conditioning air with the aid of
heat and fluid media comprising the steps of recirculat-
ing air from an enclosure through a conditioning zone,
drying air in said conditioning zone in a plurality of
steps, said first step of drying comprising the transfer
of moisture from air leaving the enclosure to air moving
toward said enclosure by cyclically circulating a sorbent
therebetween, said second step of drying comprising the
circulation of a sorbent in contact with the air after
drying by the first drying step, regenerating the sorbent
in the second drying step by passing a high temperature
medium in contact with the sorbent and heating the
medium by heat supplied from outside the system, par-
tially cooling the dried air anhydrously after the second
drying step by exchange with a fluid medium and fur-
ther cooling the air by the evaporation of moisture trans-
ferred from the air leaving the enclosure to thereby re-
generate the sorbent in the first drying step, whereby to
reduce the amount of high temperature heat required to
produce the desired drying.

7. The method of conditioning air for an enclosure with the aid of regenerative thermodynamic exchange means which comprises a first and a second exchanger means moving cyclically between the air leaving the enclosure and a stream of other air which method comprises drying the air leaving the enclosure in the first exchange means, regenerating said first mentioned means by a heated stream of the other air circulating in a closed circuit, cooling said air withdrawn from the enclosure in the second exchange means, said last mentioned means being regenerated by out-door air.

8. In a method of conditioning air causing said air to flow successively through a plurality of stations, said air at one station being treated by passing it through an air permeable solid sorbent material to attain a psychrometric condition of a lower moisture content, removing heat from the air at another station and further cooling the air at a third station by evaporation to attain a psychrometric condition of still lower temperature and higher moisture content, wherein said sorption and evaporation steps are effected at least partially by transfer of moisture from the air at said first station to air at said third station, thereby evaporating thereinto at least part of the moisture stored in said sorbent material during the flow of said air through said stations.

9. An air conditioning system comprising at least two separate main passages one of which is traversed by one air flow and another by another air flow, at least one moisture exchanger and at least one heat exchanger both comprising a mass of air permeable material and mounted to move cyclically between said two passages to cause said air flows to exchange vapor contents and temperatures, and a third thermodynamic exchanger also comprising air permeable material mounted to move cyclically between one of said main passages and a third passage.

10. The method of air conditioning with the aid of heat and fluid media comprising the steps of recirculating air from an enclosure through a conditioning zone, drying the air in said zone by moving air permeable solid sorbent material in contact with the air, regenerating the sorbent by passing a higher temperature medium in contact with the sorbent at a place separate from the place contacted by the air being conditioned, cooling the air by removing sensible heat by exchange with fluid media, and then further cooling the dried air by exchange with air circulating in said zone.

11. Method of conditioning air for an enclosure which comprises the steps of passing the air to be conditioned through a drying zone containing air permeable solid sorbent material, removing moisture from the air in the drying zone by contact with the sorbent as it flows therethrough, continuously moving said solid sorbent to expose successive areas to air being conditioned, storing said moisture in the sorbent material in a liquid state, removing sensible heat from said air, and cooling said air by evaporating thereinto at least part of the moisture stored in such sorbent material.

12. Method of conditioning air for an enclosure by means of regenerative moisture exchange means containing air permeable solid sorbent material which is moved cyclically between two passage means, said method comprising the steps of drying the air to be conditioned, removing sensible heat therefrom and cooling said air by passing air through said passage means, the air in one of said passage means having a higher enthalpy and a higher relative humidity than the air in the other passage means, and performing the step of cooling said air by moving said sorbent cyclically between said passage means to absorb moisture in the sorbent from the air in said one passage means and evaporating moisture from the sorbent into the air to be conditioned as it passes through the other passage means.

13. The method according to claim 12 in which the air in said one passage means comprises air withdrawn from the enclosure.

14. Method according to claim 13 in which the air to be conditioned passes through both passage means.

15. The method of conditioning air for an enclosure which comprises the steps of passing the air to be conditioned through a drying zone, to remove moisture therefrom, passing a regenerating medium through a regenerating zone, moving an air permeable mass of solid sorbent material cyclically between said zones, storing at least a part of the moisture removed from the air by said sorbent material, removing sensible heat from said air, and further cooling said air by evaporating thereinto moisture stored in the sorbent material in the drying step.

16. A system for conditioning air for an enclosure with the aid of heat and fluid media, comprising a conditioning chamber, means for circulating air through the enclosure and said conditioning chamber, a mass of air permeable solid sorbent material mounted for movement in said chamber, means for continuously moving the mass of solid sorbent to contact one area with the air passing through said chamber, means for regenerating said sorbent by passing a higher temperature medium in contact with another area of said sorbent, cooling means in said chamber engaged by said dried air for removing sensible heat by heat exchange with fluid media, and a second cooling means for further cooling the dried air by exchange with air circulating within the said chamber.

References Cited in the file of this patent

UNITED STATES PATENTS

| | | |
|---|---|---|
| 1,994,515 | Hausen | Mar. 19, 1935 |
| 2,029,438 | Knight | Feb. 4, 1936 |
| 2,058,042 | Shipman | Oct. 20, 1936 |
| 2,127,993 | Crawford | Aug. 23, 1938 |
| 2,133,334 | Rosett | Oct. 18, 1938 |
| 2,147,248 | Fleisher | Feb. 14, 1939 |
| 2,197,203 | Buffington | Apr. 16, 1940 |
| 2,233,189 | Altenkirch | Feb. 25, 1941 |
| 2,266,219 | Larriva | Dec. 16, 1941 |
| 2,344,384 | Altenkirch | Mar. 14, 1944 |
| 2,700,537 | Pennington | Jan. 23, 1953 |